United States Patent [19]

Leiber et al.

[11] Patent Number: 4,846,534

[45] Date of Patent: Jul. 11, 1989

[54] ANTILOCKING SYSTEM FOR A ROAD VEHICLE

[75] Inventors: Heinz Leiber, Oberriexingen; Reinhard Resch, Stuttgart, both of Fed. Rep. of Germany

[73] Assignee: Daimler-Benz Aktiengesellschaft, Stuttgart, Fed. Rep. of Germany

[21] Appl. No.: 220,806

[22] Filed: Jul. 18, 1988

[30] Foreign Application Priority Data

Jul. 18, 1987 [DE] Fed. Rep. of Germany ....... 3723876

[51] Int. Cl.$^4$ .............................................. B60T 8/62
[52] U.S. Cl. ..................................... 303/115; 303/119
[58] Field of Search ............... 303/102, 103, 105, 110, 303/111, 114, 115, 119

[56] References Cited

U.S. PATENT DOCUMENTS 3,877,759  4/1975  Sekiguchi et al. .................. 303/115

Primary Examiner—Duane A. Reger
Attorney, Agent, or Firm—Barnes & Thornburg

[57] ABSTRACT

In an antilocking braking system, a pressure modulator is provided for the control of pressure reduction and pressure build-up phases, wherein a drive pressure space of this modulator is placed under a pressure control to move a modulator piston into an end position associated with a minimum volume of a work chamber, which forms a section of the master brake line. In this end position, a spring-loaded inlet valve, connected between the work chamber of the pressure modulator and the brake booster of the brake system, is held in its open position by a tappet. As a result of pressure release in the drive pressure space, the modulator piston is displaced in the direction of its end position associated with a maximum volume of the work chamber, so that brake fluid can flow back into the work chamber from one or more wheel brakes connected to this work chamber. In order to provide functional reliability and protect against a malfunction of the modulator together with its auxiliary pressure source and/or its inlet valve, a bypass flow path is provided which is both parallel to the flow path leading from the work chamber of the pressure modulator to the wheel brakes, and which can be released and closed by a solenoid valve.

12 Claims, 3 Drawing Sheets

ANTILOCKING SYSTEM FOR A ROAD VEHICLE

BACKGROUND AND SUMMARY OF THE INVENTION

The invention relates to an antilocking braking control system for a road vehicle having a hydraulic multiple circuit brake system with at least one closed brake circuit which is connected to an output pressure space of a brake booster in which a static pressure, proportional to the force of actuation, is generated. This pressure is connected to a primary chamber of a pressure modulator provided to control pressure reduction, pressure build-up, as well as pressure maintenance phases of the antilocking control system for the at least one wheel brake of the static brake circuit via an inlet valve, which is mechanically drivable into its open position. The wheel brake can be connected to, or alternatively closed off from, the primary chamber of the pressure modulator via an electrically controllable brake pressure control valve, formed as a 2/2-way solenoid valve.

The inlet valve, which is mechanically drivable into an open position, is located in a primary chamber of a pressure modulator for controlling pressure reduction and pressure build-up, as well as pressure maintenance phases of the antilocking control system, to at least one wheel brake of the static brake circuit. The wheel brake is connectable to, and alternatively closed off from, the primary chamber of the pressure modulator.

An electrically controllable brake pressure control valve in the form of a 2/2-way solenoid valve is connected between the primary chamber and the at least one wheel brake. The pressure modulator has a drive pressure space separated from the primary chamber by a modulator piston. The drive pressure space is connected in normal non-antilocking braking control mode to a pressure output source. The pressure output source provides and maintains a high pressure level of brake fluid.

An auxiliary pressure source provides a high output pressure brake fluid source connected to the driven pressure space, via an electrically controllable ABS function control valve, to supply high pressure brake fluid when the ABS valve is in its basic position. The high pressure brake fluid in the driven pressure space applies a force to the modulator piston which is biased against a pressure force by the action of a powerful restoring spring and the pressure prevailing in the primary chamber. The high pressure force displaces the piston to an end position, associated with a minimum volume of the primary chamber.

An electronic ABS control shifts the ABS valve from its basic position to an excited position, wherein the ABS valve controls a flow of pressure from the driven pressure space to a pressureless reservoir of the auxiliary pressure source, upon an activation of the antilocking control system in the sense of a brake pressure reduction at the at least one wheel brake of the static brake circuit.

The ABS valve is switched back to its basic position by the ABS Control during at least one of: a pressure build-up phase, a pressure maintenance phase of the antilocking control system for the at least one of the wheel brakes, or an operating phase of the antilocking control system in which all wheel brakes of the static brake circuit are closed off from the primary chamber of the pressure modulator due to brake fluid being fed back from the at least one wheel brake into the brake booster.

The primary chamber has a maximum volume corresponding to between 25% and 50% of a volume of brake fluid quantity which can be expelled back into the brake circuit by an actuation of the brake booster upon a maximum possible force of actuation. The ABS electronic control provides control signals necessary for appropriately controlling the ABS control valve in response to output signals which are characteristic of the motion behavior of the vehicle wheels as sensed by wheel speed sensors associated with the vehicle wheels.

A bypass control valve is opened when the modulator piston reaches at least one of its end positions, associated with a maximum volume of the primary chamber, or reaches the immediate vicinity thereof, to connect the brake booster to the at least one wheel brake through a bypass flow path.

An antilocking system of this type is the subject of Applicants' German Unpublished Patent Application P No. 36 37 781.3-21, which corresponds to U.S. patent application Ser. No. 07/116,867, filed Nov. 5, 1987, and now pending in Patent Examining Group 314.

In the antilocking control system described therein, the pressure modulator associated with the closed brake circuit, for example the front axle brake circuit, is of the type of a hydraulically driven pump having a feed pressure space (the primary chamber) which is movably defined and separated from a secondary chamber (the drive pressure space) by a modulator piston. The drive pressure space is connectable by means of an ABS function control valve to the high pressure output of an auxiliary pressure source, whereby the modulator piston is pushed into an end position, associated with a minimum volume of the primary chamber against the action of a powerful restoring spring. In this end position of the piston, an inlet valve, designed as a ball-seat valve, is held in its open position by a tappet supported on one side by a valve ball, and on the other side by the piston, as a result of which the output pressure space of the brake booster which is connected with inlet valve, communicatives with the primary chamber.

The two front wheel brakes are each connected to an output of the primary chamber via a brake pressure control valve designed as a 2/2-way solenoid valve. In the normal operating state of the brake system, i.e., when the brake system is not subjected to antilocking control, the high output pressure of the auxiliary pressure source is connected to the drive pressure space of the pressure modulator, and the piston of the latter is thereby held in the end position associated with a minimum volume of the primary chamber.

The piston and the auxiliary pressure source are so dimensioned that the piston remains in the above-mentioned end position, even if a braking action is performed with the maximum brake pressure. This maximum pressure is connected to the wheel brakes via the open inlet valve, the primary chamber and brake control valves when in their basic positions. If a locking tendency occurs at one of the braked wheels, which requires a pressure reduction in the wheel brake, then the brake pressure control valve of the other wheel brake is driven to its locking position, and the ABS control valve is driven to an excited position, in which the control pressure previously connected to the drive pressure space of the pressure modulator can be released towards a pressureless reservoir of the auxiliary pressure source. As a result, the piston is subjected to a displacement in the sense of a volume enlargement of the primary chamber, under the influence of the restoring spring and the brake pressure in the primary chamber. The inlet valve reaches its locking position after a small initial displacement of the piston in this displacement direction, and a pressure reduction at the brake to be controlled is achieved as the volume of the primary chamber is further enlarged.

The pressure modulator is so dimensioned that the maximum pressure reduction stroke of the modulator piston is sufficient for this, even if previously almost all of the maximum possible brake pressure was coupled into the wheel brakes and has to be reduced to a large degree by the control system. A pressure reduction of this kind, within one piston stroke, however, is no longer possible when the control system is effective on both wheel brakes.

For example, when a detected output signal of a position indicator, provided for the recording the piston position and characteristic of the piston position, no longer changes while the control system still continues to call for a pressure reduction at the wheel brakes, the brake pressure control valves of both wheel brakes are driven to their locking position.

The drive pressure space of the pressure modulator is again connected to the high output pressure of the auxiliary pressure source, as a result of which the modulator piston is then subjected to a displacement in the sense of a reduction of the volume of its primary chamber. The inlet valve has a construction corresponding to a non-return valve which opens as a result of the pressure building up in the primary chamber and brake fluid being expelled back out of the primary chamber into the tandem master cylinder. The pressure modulator functions in this phase like the return feed pump of known antilocking control systems.

After completing such a return feed stroke of the pressure modulator, the pressure reduction mode can be continued again by renewed displacement of the piston in the sense of an enlargement of the volume of the primary chamber. In order that the brake system, while operating without the antilocking control functions, remains functional even when the auxiliary pressure source has failed and the piston of the pressure modulator withdraws to its end position associated with a maximum volume of the primary chamber, a bypass valve designed as a ball-seat valve is provided which releases a second pressure medium flow path leading from the brake booster to the primary chamber of the pressure modulator as soon as the piston has reached a minimum distance, corresponding to the greatest part of its maximum stroke.

The valve ball, which up until then was pushed into its locking position by a spring-loaded closing element, is taken along with the piston from the point where the latter reaches a minimum stroke, so that the ball can separate from the valve seat.

Irrespective of numerous advantageous functional features of this antilocking control system in comparison to antilocking control systems of similar construction, an unfavorable feature is evident in the case where the auxiliary pressure source, although it has not failed completely, supplies only a reduced output pressure. There, the modulator piston can no longer be pushed into its end position, associated with a minimum volume of the primary chamber, by subjecting its drive pressure space to high pressure. This end position is also utilized for the non-controlled braking mode, so that the piston withdraws slightly under the influence of the brake pressure connected to the primary chamber, as a result of which the inlet control valve can reach its locking position even during the normal braking mode, and this leads to at least a restriction of the utilizable brake pressure, which of course is unacceptable.

Even more unfavorable is of course the case when the output pressure of the auxiliary pressure source is no longer sufficient to displace the piston, against the bias restoring force of the powerful restoring spring, at least close enough to its end position, associated with a minimum volume of the primary chamber. Such a displacement is necessary for the valve ball of the inlet valve to be lifted off its valve seat during at least part of its normal opening stroke, and for the bypass valve to remain held in its locking position by the still partially possible displacement of the modulator piston. If this displacement does not occur, it is no longer possible to brake at all with the brake circuit connected to the pressure modulator. The relatively complicated mechanical construction of the pressure modulator, including the inlet and the bypass valves, can also be seen as a disadvantage, albeit a less grave one.

The object of the invention is therefore to improve an antilocking control system of the type aforementioned that is less susceptible to malfunctioning and is of a simple construction, and in particular, one that ensures that the brake system remains functional even if the auxiliary pressure source fails. This insurance of function is obtained by utilization of a bypass flow path as will be explained subsequently.

This object is achieved according to the invention by having a bypass control valve means as a solenoid valve which is driven from a basic "O" position in which a bypass flow path is opened by an output signal from the electronic ABS control unit into an excited "I" position in which the bypass flow path is blocked, and wherein at least one pressure control valve means is movable to a basic "O" open position to allow flow between the primary chamber and the at least one wheel brake when, in the course of the pressure reduction, pressure build-up or pressure maintenance control phase of the antilocking control system, the high output pressure of the auxiliary pressure source falls below a minimum setpoint required for the displacement of the modulator piston into its end positions associated with a minimum volume of the primary chamber; and wherein this pressure control valve means is held in this basic "O" position. The design of the bypass valve as a 2/2-way solenoid valve, which can be driven by the electronic control, to the respective function position appropriate to the situation, irrespective of a particular displacement position of the modulator piston, makes it possible for braking to take place in every possible position of the modulator piston. To detect the malfunction situation, where the output pressure of the auxiliary pressure source has fallen below a minimum set point, a pressure signal switch characteristic thereof, can be utilized. Such a signal is usually provided for monitoring the pressure in a pressure reservoir of the auxiliary pressure source, which can be charged by the charge pump of the auxiliary pressure source.

Although the design of the bypass valve as an additional solenoid valve entails certain additional technical expenditure, this is, however, offset by a significant simplification of the construction of the pressure modulator, since a mechanically actuable bypass valve and the actuation closing elements necessary for its control are dispensed with. As a result, the pressure modulator can be manufactured with a considerably simpler construction, and hence more cheaply.

In the antilocking control system of the present invention, a position indicator is provided which generates electrical output signals characteristic of the displacement of the modulator piston. The output signals are connected to the electronic ABS control as further information inputs. The electronic ABS control generates signals characteristic of the displacement behavior of the modulator piston, as well as of the approach of the piston to its possible end positions, for switching the bypass valve into the excited locking position. It is possible to control the bypass valve appropriately to the situation using simple logical combinations. The additional technical electronic expenditure necessary with respect to this extension of the electronic control unit of the ABS can therefore be regarded as negligible.

This is particularly true when the inlet valve is designed as a one-way valve which is actuated in an opening direction by higher pressure in the primary chamber of the pressure modulator than in a valve chamber connected between the brake booster and the bypass path. A valving surface of the inlet valve is raised from a seat by an actuation tappet which is displaced by the piston of the pressure modulator, when the piston of the pressure modulator at least occupies the end position associated with a minimum volume of the primary chamber, or is displaced from the latter end position by less than a small fraction of 1/20 to 1/5 of total piston displacement.

The tappet passes through an inlet channel of the pressure modulator, which contains the valve seat, and the valving surface is held tightly against the valve seat by the restoring force of the valve spring and the pressure prevailing in a valve chamber in the bypass path. Here, the inlet seat valve can be attached directly to the modulator housing by use of a simple axial extension.

The connection of the wheel brakes of the brake circuit, subjectable to the control system via a one-way valve, to an additional bypass flow path leading to a pressure output of the brake booster, has the advantage that a rapid brake pressure reduction can take place in the wheel brakes when the drive quickly and drastically reduces the pedal activation force, while at the same time the ABS control valve is still functioning in a control phase in which the bypass valve and at least one of the brake pressure control valves is locked. For example, such can occur in a pressure build-up phase at one of the wheel brakes in which the pressure build-up is effected by expelling brake fluid previously received by the pressure modulator into the wheel brake subject to control. Thus, in a simple manner and after the shortest possible time lag, the brake pressure corresponds to the anticipated value supplied by the driver by actuating the brake pedal.

As a result of this situation, the ABS control valve has a flow path which provides connection of the pressure output of the auxiliary pressure source to the drive pressure space of the pressure modulator, when the ABS control valve is in the basic position through a throttle for restricting the pressure medium flow rate to the pressure modulator to a given value. Because of this, a changed rate of the brake pressure, in pressure build-up and pressure reduction phases of the antilocking control system, is obtained in an optimum relation to each other.

A further function control valve is provided between the auxiliary pressure source and the ABS control valve and is controllable by means of output signals of the electronic ABS control unit. The auxiliary pressure source includes a Pressure reservoir which is chargable by an accumulator-type charge pump and is maintained at a specific required output pressure level by a pressure-limiting valve connected between an output pressure of the pump and a return line leading to a pressureless reservoir. A second one-way valve is connected between the further function control valve and the ABS control valve.

This permits pressure maintenance phases of the antilocking control system and charging of a pressure reservoir within the framework of the auxiliary source which can be controlled in a simple manner. With the aid of this pressure limiting valve system, it is possible to operate the accumulator-type charge pump sparingly by bridging the pressure limiting valve, the opening pressure of which determines the reservoir pressure level.

A simple embodiment of the modulator piston and a position indicator suitable for monitoring its position, is achieved when the pressure modulator is designed as a step cylinder having bore steps of different diameters which merge into one another via a housing step. The piston has a correspondingly shaped two-step configuration with a larger piston step, defining with a large diameter cylinder step, the drive space and a smaller piston step defining with a smaller diameter cylinder step, the primary chamber of the pressure modulator. The piston has a central conical section which tapers in axial direction between its two steps. The position indicator has an actuating pin radially supported on the conical section. The position indicator is configured as a travel/voltage converter for converting radial displacements of the actuating pin into voltage signals which can be processed by the electronic control unit of the ABS. This arrangement permits an exact determination of the current position of the piston, as well as its speed of travel.

An additional feature of the invention is the restoring spring, which biases the modulator piston into its end position associated with a maximum volume of the primary chamber. It is designed as a helical pressure spring which is accommodated in a central blind bore of the modulator piston in a section of its length, approximately corresponding to an axial extension of the smaller piston step and the central conical section of the piston. As a result, the restoring spring still develops a desirable amount of force even in the end position of its piston, i.e., the end associated with a maximum volume of the primary chamber of the pressure modulator.

When the modulator piston is supported in the housing of the pressure modulator, an additional restoring spring, the restoring force of which is of a maximum at the position associated with a minimum volume of the primary chamber, also biases the piston as it is displaced increasingly away from this minimum volume position. The force of this additional restoring force reduces to a zero value at approximately $\frac{1}{4}$ to $\frac{1}{3}$ of the total stroke of the piston. A considerable restoring force is thus available in the particular one stroke region of the piston directly adjacent to the end position associated with a minimum volume of the primary chamber. The two restoring springs have a suitable dimensioning wherein the sum of the maximum values of the restoring forces of the biasing springs and the force resulting from a maximum output pressure of the brake booster acting upon the piston in the primary chamber, all operate in the sense of an enlargement of the primary chamber volume, and are of a value which is at least less than, or approximately equal to, the force in the driven pressure space which displaces the piston into its end position associated with a minimum volume of the primary chamber when the modulator piston is subjected to the output pressure of the auxiliary pressure source. Such a control system allows for counterphase control, i.e., the brake pressure can be built up in one wheel brake, while brake pressure is reduced at the other wheel brake.

Other objects, advantages and novel features of the present invention will become apparent from the following detailed description of the invention when considered in conjunction with the accompanying drawings.

DETAILED DESCRIPTION OF THE DRAWINGS

Figure 1:
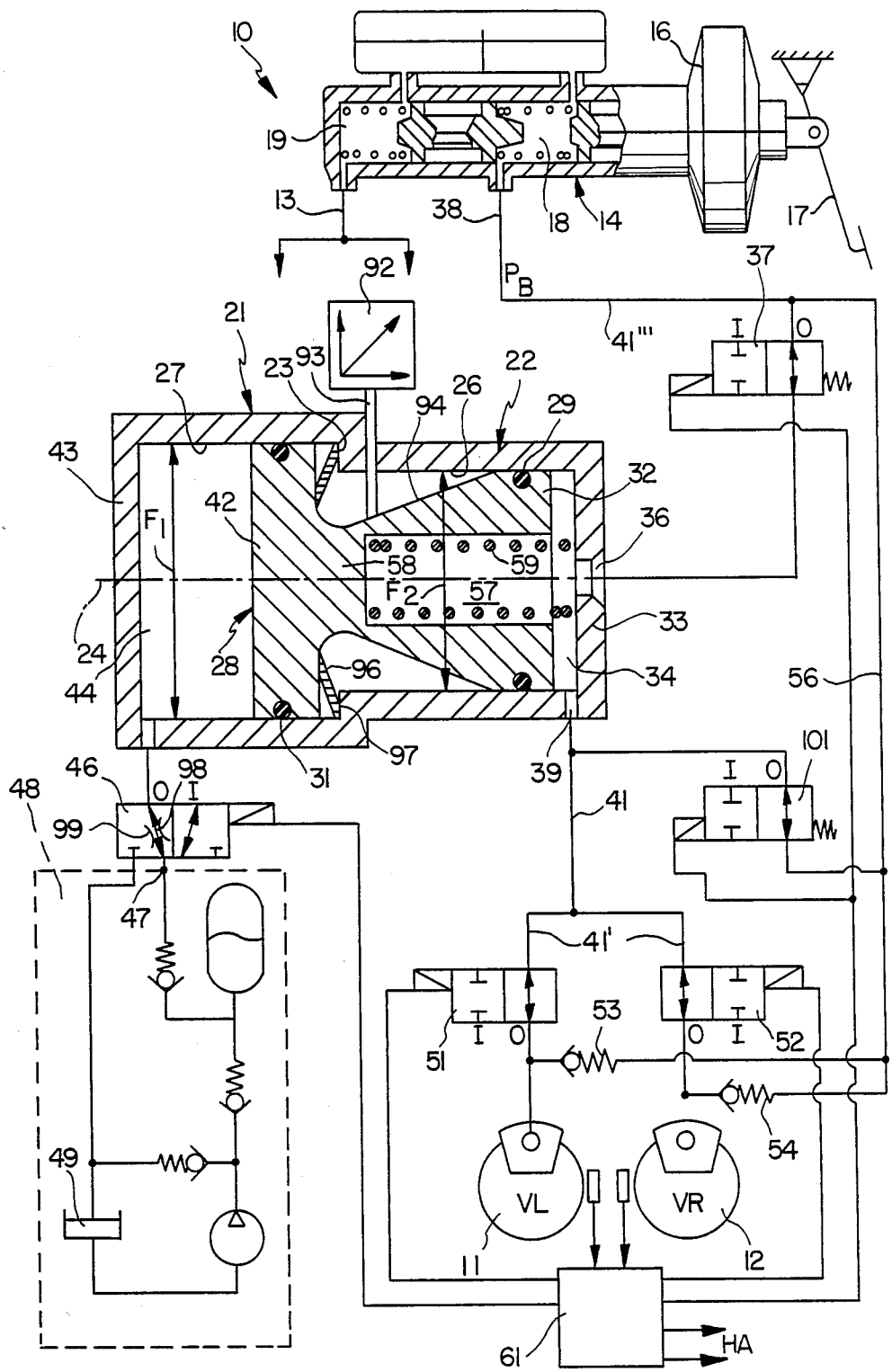
FIG. 1 shows a simplified diagrammatic representation of an antilocking control system according to the present invention, related essentially to the front axle brake circuit of a road vehicle, having only one pressure modulator provided for the control of brake pressure at the two wheel brakes of this brake circuit.

The essential functional elements of an antilocking control system 10 for a road vehicle is provided with a hydraulic dual circuit brake system. The vehicle front wheel brakes 11 and 12 are combined in a front axle brake circuit I, and the rear brakes, not shown for the sake of simplicity, are combined in a rear axle brake circuit II, which is represented in the illustration of FIG. 1 merely by its master brake line 13 branching towards the rear wheel brakes. Both brake circuits I and II are assumed to be static brake circuits.

A tandem master cylinder 14 of conventional construction is provided as brake booster, and can be actuated via a brake power assist unit 16, for example a vacuum brake power assist unit, by the brake pedal 17. As is normal, the front axle brake circuit I is connected to the primary output pressure space 18, and the rear wheel brake circuit II is connected to the secondary output pressure space 19 of the tandem master cylinder 14.

The antilocking control system for both the rear axle and the front axle of the vehicle, can utilize the same construction principles so that it is sufficient to describe the constructional and functional details of the antilocking control system 10 only with reference to the front axle. Alternatively, the antilocking control system at the rear axle might utilize the known return feed principle. Where letter indices are used in the description below, the index "V" denotes the front axle, the index "H" denotes the rear axle, the index "L" denotes the left side of the vehicle, and the index "R" denotes the right side of the vehicle.

In the specific exemplary embodiment shown in FIG. 1, a pressure modulator, denoted overall by 21, is provided as the central element of the antilocking control system 10 effective at the front axle for controlling pressure modulator brake pressure reduction and brake pressure build-up phases in the course of an antilocking control cycle being executed at one or the wheel brake(s) 11 and/or 12 of the front axle brake circuit I, respectively.

The pressure modulator 21 is designed as a step cylinder, the housing 22 of which has two bore steps 26 and 27 which are mutually offset and interconnected respectively via a radial step 23, and which bore steps are coaxial with respect to the central longitudinal axis of the modulator housing 22. A correspondingly stepped modulator piston 28 is seated in these bores and is sealed therein by circumferential seals 29 and 31.

A primary chamber 34 of the pressure modulator 21 is bounded in axial direction by the smaller diameter piston flange 32 of the movable modulator piston 28 within the smaller bore step 26 and by fixed end wall 33 which closes off this bore step 26 from the outside. The primary chamber 34 has a pressure input 36 connected via a control valve 37, designed as a 2/2-way solenoid valve to the primary pressure output 38, associated with the front axle brake circuit I, of the tandem master cylinder 14, as well as to a pressure output 39, to which the main brake line 41, branching to the wheel brakes 11 and 12, of the front axle brake circuit I is connected. A drive pressure space 44 is bounded in axial direction by the larger annular flange-shaped piston step 42 of the movable modulator piston 28 and by the end wall 43 of the modulator housing 22. The end wall 43 closes and seals off the housing bore 27 in which the larger piston step 42 of the modulator piston moves. The drive pressure space 44 can be connected via an antilocking control system ABS control valve 46 alternatively to an output 47, maintained at a high pressure level of a hydraulic auxiliary pressure source 48, or can be connected to pressureless reservoir 49.

The ABS control valve 46 is designed as a 3/2-way solenoid valve, in the basic "O" position of which, the drive pressure space 44 of the pressure modulator 21 is connected to the pressure output 47 of the auxiliary pressure source 48, and locked from the reservoir 49. In the excited "I" position, the drive pressure space 44 of the pressure modulator 21 is connected to the reservoir 49 of the auxiliary pressure source 48, and locked from the pressure output 47 thereof.

The brake pressure control valves 51 and 52 are connected to brake line branches 41' of the front axle brake circuit I, and can be actuated individually or, from time to time, jointly by the pressure output 39 of the pressure modulator 21 to control the pressure build-up phases of the antilocking control system. These valves are designed as 2/2-way solenoid valves whose basic "O" position is the through-flow position, and whose excited "I" position is the blocking position.

Further, the wheel brakes 11 and 12 are each connected via one-way pressure responsive valves 53 and 54 to a bypass line 56, which in turn is connected directly to the primary pressure output 38 of the tandem master cylinder 14, or respectively to a brake line section 41''' of the front axle brake circuit I. The brake line section 41''' lead from the tandem master cylinder 14 to the control valve 37 by means of which this primary pressure output 38 can be locked from the pressure input 36 of the pressure modulator 21 in the excited "I" position and opened to the pressure input 36 in the basic "O" position.

The one-way valves 53 and 54 are subjected to higher pressure in the wheel brake cylinders of the front wheel brakes 11 and 12 than in the bypass line 56, or in the primary output pressure space 18 of the tandem master cylinder 14, and are opened when the driver reduces the pedal actuation force, so that even if the inlet control valve 37 sticks in its locking position, brake pressure can be reduced via the bypass line 56.

The modulator piston 28 is provided with a central blind bore 57, the depth of which, measured in the direction of the central longitudinal axis 24, corresponds approximately to the length of the smaller diameter piston step 32 and is open towards the primary chamber 34 of the pressure modulator 21. A powerful restoring spring 59 is supported on the base 58 of this bore 57 and on the end wall 33, which closes off the smaller bore step 26 from the outside. The restoring spring 59 attempts to push the modulator piston 28 out of its illustrated position, which corresponds approximately to the end position of the piston 28 associated with a minimum volume of the primary chamber 34, into its other end position associated with a maximum volume of the primary chamber 34, to produce a minimum volume of the drive pressure space 44. The modulator piston 28 is supported in this other end position (on the left according to FIG. 1) at the end wall 43, while closing off the larger bore step 27 of the modulator housing 22.

Before reference is made to the specific constructional details of the pressure modulator 21 and its function, it will first be explained how the pressure build-up, pressure maintenance and pressure reduction phases required for the antilocking control system can be controlled with the function components of the ABS 10 at the front wheel brakes 11 and 12. The operation of the safety bypass valve 101 and monitoring control 92 will be explained later.

As long as the antilocking control system has not been actuated, the inlet control valve 37, the ABS control valve 46 and the brake pressure control valves 51 and 52 occupy their illustrated basic "O" positions. The piston 28 of the pressure modulator 21 is subjected on its surface $F_1$, corresponding to the cross-sectional area of its large piston step 42, to the high output pressure $P_A$ of the auxiliary pressure source 48, which is coupled into the drive pressure space 44 of the pressure modulator 21 via the ABS control valve 46, when in its basic "O" position.

The modulator piston 28 is subjected on its surface $F_2$, corresponding to the cross-sectional area of the smaller piston step 32, to the brake pressure $P_B$ generated by the brake booster 14, and connected to the primary chamber 34 via the inlet control valve 37 occupying its basic "O" position. Brake pressure $P_B$ is also corrected to the wheel brakes 11 and 12 of the front axle brake circuit I via the brake pressure control valves 51 and 52 and the pressure output 39 of the pressure modulator 21.

The ratio $F_1/F_2$ of the effective piston surfaces of the modulator piston 28 is sufficiently large, so that even if the maximum brake pressure $P_B$, attainable by actuation of the brake booster 14, is coupled into the primary chamber 34, the piston 28 can be pushed to the right by subjecting its large piston area 42 to the output pressure $P_A$ of the auxiliary pressure source 48 against the increasing restoring force of the restoring spring 59 and the pressure force $P_B$ in chamber 34 in its right end position and associated with a minimum volume of the primary chamber 34, and can be held in this position as long as the control pressure space 44 is connected to the high pressure output 47 of the auxiliary pressure source 48.

If a locking tendency occurs during the course of a braking action, for example on the left front wheel, then an initial pressure reduction phase of an antilocking control cycle is required. To provide for this pressure reduction phase, the control valve 37, connected between the pressure output 38 of the brake booster 14 and the pressure input 36 of the pressure modulator 21, is switched to its excited "I" position; i.e., the blocking position. The ABS control valve 46 is likewise switched to its excited "I" position; i.e., the through-flow position connecting the drive pressure space 44 to the pressureless reservoir of the auxiliary pressure source 48. The brake pressure control valve 52 of the right front wheel brake 12 is likewise switched to its excited "I" position; i.e., the blocking position, while the brake pressure control valve 51, which is associated with the left wheel brake 11 at which the brake pressure is to be reduced, remains in its basic "O" position; i.e., the through-flow position.

The pressure reduction is achieved by the displacement of the modulator piston 28, due to the movement of the ABS valve 46 to its excited "I" position where the pressure in the drive pressure space 44 is vented to reservoir 49, and by the restoring spring 59 and the pressure $P_B$ trapped in the primary chamber 34 by virtue of the inlet valve 37 being moved to its excited "I" position to provide a volume enlargement of the primary chamber 34. The brake fluid can now flow out of the left front wheel brake 11 into the primary chamber 34 of the pressure modulator 21 via brake pressure control valve 51 retained in its basic "O" position and conduits 41', 41 and 39. Pressure reduction phases at the right wheel brake or pressure reduction phases required at both front wheel brakes 11 and 12, are controlled analogously.

If, after a pressure reduction phase, the brake pressure is to be maintained at the front wheel brake(s) subjected to the control system, then, while the control valve 37 remains in its blocking position, the two brake pressure control valves 51 and 52 are driven to their excited "I" blocking positions while the ABS control valve 46 is switched back to its basic "O" position. As a result of this, the output pressure $P_A$ of the auxiliary pressure source 48 is again present in the drive pressure space 44, but the piston 28 cannot be displaced in the sense of a brake pressure build-up, since the primary chamber 34 of the pressure modulator 21 is blocked both from the tandem master cylinder 14 via the inlet control valve being in its excited "O" position, and from the wheel brakes 11 and 12 via brake pressure control valves 51 and 52 being in their excited "I" positions.

It is sometimes desired to have a subsequently required pressure build-up phase at the front brake(s), so that the brake pressure control valve 51 and/or 52 of the respective front wheel brake(s) 11 and/or 12 is switched back to its basic "O" position, while the control valve 37 remains held in its excited "I" blocking position precluding fluid contact with the tandem master cylinder.

Under the influence of the output pressure $P_A$ due to the auxiliary pressure source 48 being coupled into the drive pressure space 44 of the pressure modulator 21, the modulator piston 28 is therefore subjected to a displacement to the right, in the sense of a reduction of its primary chamber 34, as a result of which brake fluid, which had been previously received in the primary chamber 34 from the wheel brake(s) 11 and/or 12 subject to the control system in the sense of a pressure reduction, is therefore pushed back again, in the sense of a pressure build-up, into the front wheel brake(s) 11 and/or 12.

If, after a pressure build-up phase, controlled in this manner by the antilocking control system, a locking tendency no longer occurs at the front axle, then the inlet control vale 37, connected between the tandem master cylinder 14 and the pressure modulator 21, is switched back to its basic "O" position, so that the output pressure $P_B$ of the tandem master cylinder 14 is again available for a further brake pressure build-up.

The control signals required for appropriately controlling the function of the inlet control valve 37 and the ABS valve 46, as well as the brake pressure control valves 51 and 52, are generated according to known criteria by an electronic ABS control unit 61 (diagrammatically shown in FIG. 1), essentially by a comparing and differentiating processing of the output signals from wheel-spaced sensors 62 and 63 (FIG. 2), which are provided to monitor the movement behavior of the vehicle wheels and which output electrical signals characteristic of their circumferential speeds.

In the ABS 10 according to FIG. 1, various control phases are possible at the two front wheel brakes 11 and 12 inasmuch as the brake pressure can be maintained at one wheel brake 11 or 12, while it is lowered or increased at the other front wheel brake 12 or 11, respectively. Unfortunately, a counter-phase brake pressure change at both front wheel brakes 11 and 12, in the sense that the brake pressure is increased at one wheel brake 11 or 12 and simultaneously lowered at the other wheel brake 12 or 11, is not possible.

Figure 2:
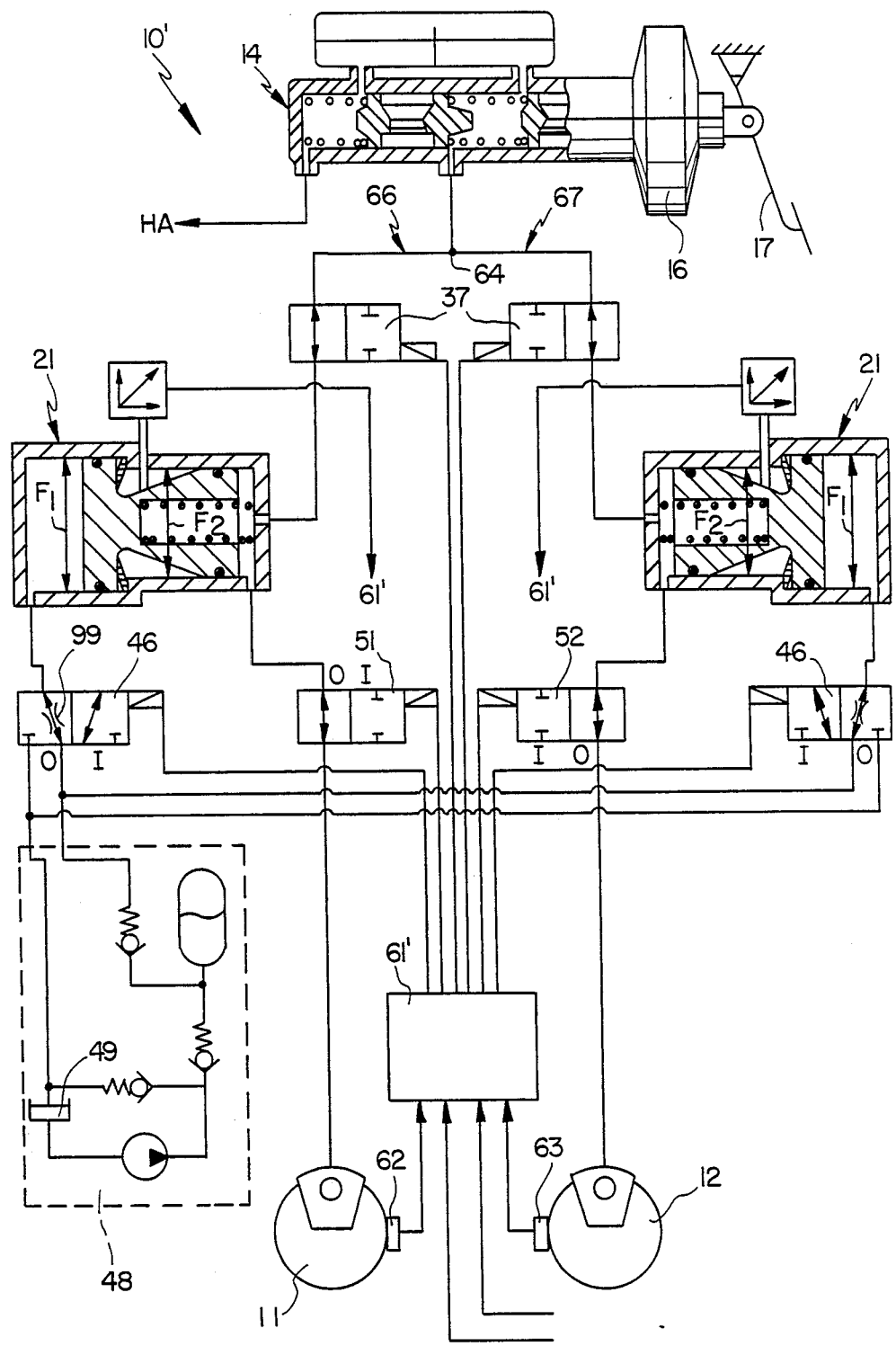
FIG. 2 shows an exemplary embodiment of the present invention having the pressure modulators associated with each of the wheel brakes subjectable to the control system, in a representation corresponding to that of FIG. 1.

However, counter-phase brake pressure control of the front wheel brakes 11 and 12 is possible in the exemplary embodiment as shown in FIG. 2. For each of the front axle brake circuit branches, denoted overall by 66 or 67 respectively, and starting from the branch point 64 of the front axle brake circuit I leading from the tandem master cylinder 14, an individual pressure modulator 21, the basic construction of which was described with the reference to FIG. 1, is provided. Also, each circuit 66, 67 includes a connection control valve 37 and an ABS control valve 46 of the type previously described for each one of the two wheel brakes 11 or 12. A single auxiliary pressure source 48 is utilized for both brake circuit branches 66 and 67 in the hydraulic circuit shown in FIG. 2.

The design of the electronic control unit 61' of the ABS 10' according to FIG. 2, required for the Possibility of counter-phase control of a brake pressure at the front wheel brakes 11 and 12, is easily within the purview of a person skilled in the art and informed of the purpose of the control system, and the details thereof are believed unnecessary to enable one to use and make the invention, and thus have not been shown.

In as much as functional elements shown in FIG. 2 are denoted by the same reference symbols as in FIG. 1, reference is here made to the description associated with FIG. 1 as concerns the constructional and functional elements. As each of the front wheel circuits have individual ABS valves and pressure modulator pistons, the control 61' can, by appropriate independent actuation of the ABS valve, provide an increase pressure to one front wheel brake while simultaneously lowering the pressure to the other front wheel brakes, thus providing counter-phase control not possible in FIG. 1.

Figure 3:
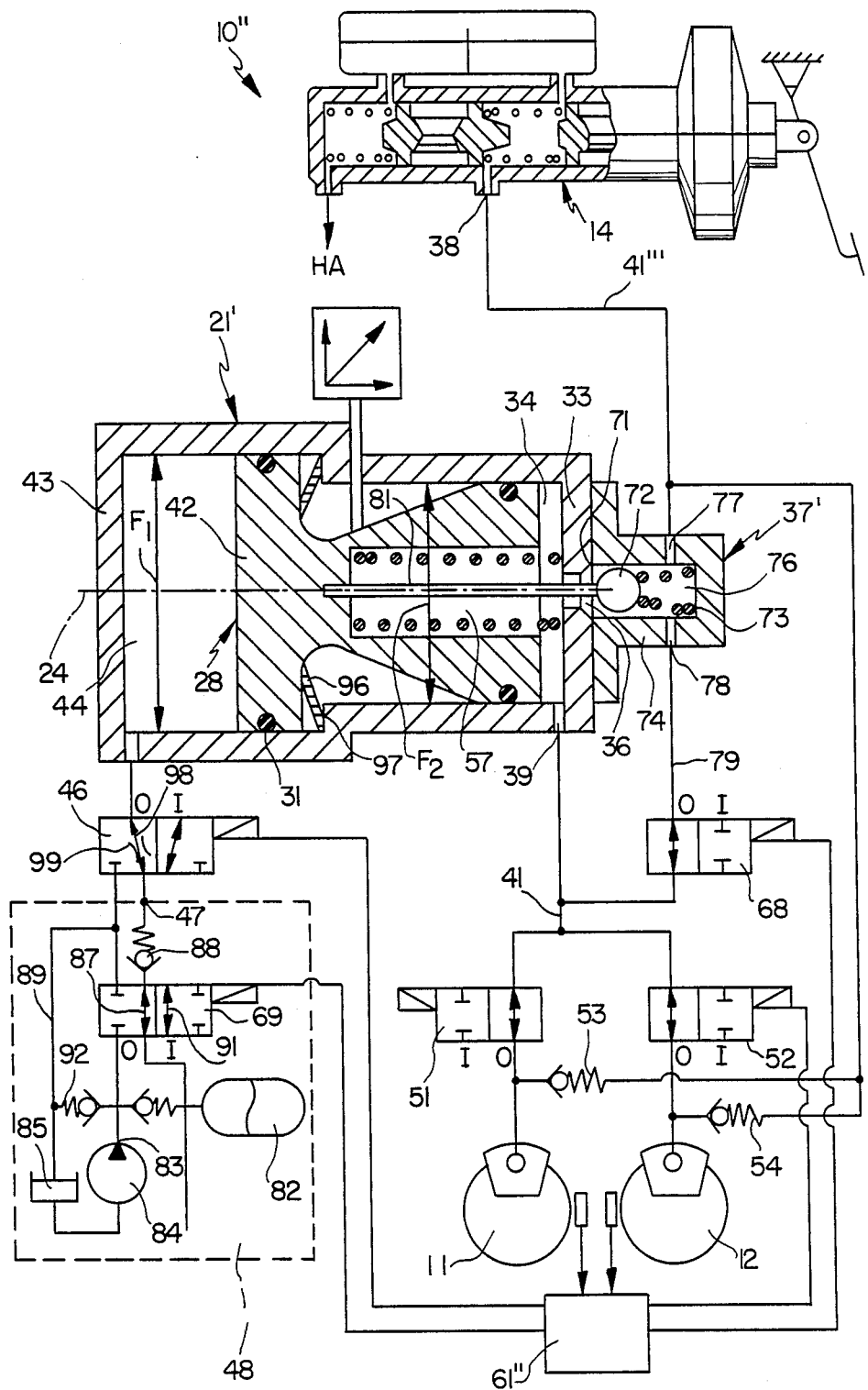
FIG. 3 shows an ABS control corresponding in it basic construction to the ABS control according to FIG. 1, but having a pressure modulator with mechanical inlet valve and electrically controllable bypass valve.

FIG. 3 shows a further exemplary embodiment of an antilocking system 10" falling within the scope of the inventive idea, which essentially corresponds to the one shown in FIG. 1, but which differs therefrom by the special combined design of the pressure modulator 21' in conjunction with the pressure inlet valve 37'. Here a mechanical ball valve 72 controls the pressure feed from the brake booster 14 into the primary chamber 34 of the pressure modulator 21'. Also, an additional electrically controllable bypass valve 68, designed as a 2/2-way solenoid valve, is provided, by means of which the output pressure of the tandem master cylinder 14 can be coupled into the wheel brakes 11 and 12 of the front axle brake circuit I even if the inlet valve 37' has attained its blocking position as a result of a malfunction. Still further, an additional function control valve 69 is provided in combination with the ABS control valve 46 for controlling pressure feed into the drive pressure space 44 of the pressure modulator 21'.

In as much as constructional and functional elements of the ABS 10" according to FIG. 3 is similar to the ABS 10 according to FIG. 1, reference is made to the relevant description parts of FIG. 1 in order to avoid repetition.

In the embodiment of FIG. 3, the pressure inlet valve 37' is designed as a ball-seat valve, the valve seat 71 of which is formed by a conical bevel of the pressure input channel 36. The bevel is arranged on the outer side of the end wall 33 of modulator housing 22, fixedly bounding the primary chamber 34 in axial direction, of the ball valve 72, which ball valve is continuously biased by a pretensioned valve spring 73 which attempts to push the valve ball 72 into the blocking position of the inlet valve 37'.

The inlet valve 37' comprises a pot-shaped valve housing 74, which is attached so as to be pressure tight on the outer side of the end wall 33 of the pressure in the open Position of the inlet valve 37', is in communicating connection with the primary chamber 34 of the pressure modulator 21'. The valve chamber 76 has a pressure input 77 which is connected via the section 41'" of the master brake line of the front axle brake circuit I to the pressure outlet 38 of the tandem master cylinder 14 and a pressure outlet 78, from which the bypass flow path 79 starts, as well as an outlet around the ball-seat valve 37' to the outlet 39. Both of these outlets 38 and 78 of the pressure modulator 21' lead to the master brake line 41 of the front axle brake circuit I.

This bypass flow path 79 is open when the bypass valve 68 is in the basic "O" position, and blocked when the bypass valve 68 is in the excited "I" position.

The piston 28 of the pressure modulator 21' is provided with a central elongated bar-shaped, slender tappet 81 which, in the illustrated basic "O" unactivated ABS position of the modulator piston 28, has its free end passing through the pressure input channel 36, connecting the primary chamber 34 of the pressure modulator 21' to the valve chamber 76, and thus holds the valve ball 72 in its open position separated from the valve seat 71.

If, for example, a failure of the auxiliary pressure source 48 causes the inlet valve 37' to attain its locking position, it is still possible to brake at the front axle by the bypass flow path 79, which is open due to the bypass valve 68 being in the basic "O" position.

The additional function control valve 69, provided within the framework of the auxiliary pressure source 48, is designed as a 4/2-way solenoid valve connected between a pressure reservoir 82 of the auxiliary pressure source 48 and its output 47, as well as between the high pressure output 83 of an accumulator-type charge pump 84 provided for charging the pressure reservoir 82 and a pressureless reservoir 86 of the auxiliary pressure source 48.

In the basic "O" position of this function control valve 69, the pressure reservoir 82 is connected via a flow path 87 of the function control valve 69 and one-way valve 88 to the pressure output 47 of the auxiliary pressure source 48. The pressure output 83 of the accumulator-type charge pump 84 is blocked from a return line 89 leading to pressureless reservoir 86. Pressure medium can flow out of the drive pressure space 44 of the pressure modulator 21' toward the pressureless reservoir 86 of the auxiliary pressure source when the ABS control valve 46 is in its excited "I" position.

In the excited "I" position of the function control valve 69 of the auxiliary pressure source 48, the pressure reservoir 82 is blocked from the pressure output 47. Since here, however, the pressure output 83 of the accumulator-type charge pump 84 is now connected via a flow path 91 of the function control valve 69 to the pressureless reservoir 86 via return line 89, the maximum pressure limiting valve 92, connected between the pressureless reservoir 86 via return line 89 and the pressure output 83 of the accumulator-type charge pump 84 is thus bridged by a bypass flow path leading over the flow path 91 of the function control valve 69. This has the advantage that when in circulating mode, i.e., when the pump 84 is activated and the reservoir 82 does not need to be charged, the accumulator-type charge pump 84 does not work against the opening pressure, determining the maximum reservoir pressure of the pressure limiting valve 92.

By switching the function control valve 69 to its excited "I" position, a pressure build-up phase of the antilocking control system, in the course of which the piston 28 of the pressure modulator 21' is subjected to a displacement in the sense of a reduction of its primary chamber 34, can also be interrupted, i.e, the modulator piston 28 can be held at a position between its possible end positions.

In this respect, the function control valve 69 is also an essential functional element of the ABS control 10". In order to attain the above-mentioned function in the embodiment according to FIG. 1, the two brake pressure control valves 51 and 52 must be driven simultaneously to their excited "I" locking positions while the inlet control valve 37 is already occupying its excited "I" blocking position.

In the embodiment according to FIG. 3, a modification of the electronic control unit 61", which generates the control signals appropriate to the control of the ABS control valve 46, the bypass valve 68, the function control valve 69 and the brake pressure control valves 51 and 52 is easily possible for the person skilled in the art and informed of the purpose of the control system. Accordingly, the details of such a modification are not necessary for an understanding of the invention, and thus have not been shown in detail.

Further constructional and functional details can be provided in each of the exemplary embodiments.

In FIG. 1, for example, the pressure modulator 21 is equipped with a travel or position indicator 92, which generates an output signal characteristic of modulation piston position which varies continuously as the modulator piston 28 travels. This signal is supplied to the electronic control unit 61 of the ABS 10 as additional input information. This travel indicator 92 is a resistance indicator or is an inductive indicator, and records piston position by radial movement of an actuating pin 93 which is supported with its free end on a conical surface 94 of the modulator piston 28. The surface 94 extends in a taper between the flange areas 32, 42 respectively, and is sealed from the smaller bore step 26 and the larger bore step 27 of the smaller and of the larger piston step of the modulator piston 28.

The axial extension and arrangement of this conical surface 94 is such that the output signal of the position indicator 92 varies directly in proportion with the piston position in all of the possible intermediate positions of the piston 28 between its two end positions. The output signal of this position indicator 92 can be utilized in a variety of ways to monitor and control the functions of the ABS 10 as will be explained.

In addition to the restoring spring 59 effective throughout the total piston stroke range H, a second restoring spring 96 is provided which develops a relatively great restoring force only on a small range h thereof, H/4–H/6. This second restoring spring 96 is designed as a diaphragm spring, the modulator piston 28 supported by large piston step 42 and on the housing step 97. This second restoring spring 96 develops its maximum restoring force in the end position of the piston 28 that is associated with a minimum volume of the primary chamber 34. This second spring 96 affords no restoring contribution when the modulator piston 28 has traveled a distance h or more out of this end position in the sense of an enlargement of the volume of the primary chamber 34.

This restoring spring 96 is dimensioned such that the maximum restoring forces developed by the sum of restoring spring 59 and by the restoring spring 96, in the end position associated with a minimum volume of the primary chamber 34, is less by a small fraction of, for example, 5%–10% of the force that acts on the piston 28 when its drive pressure space 44 is subjected to the maximum output pressure of the auxiliary pressure source 48. With this design of the restoring springs 59 and 96, the output signal of the position indicator 92 can be utilized to check the functional readiness of the auxiliary pressure source 48 in a checking cycle in which the brake system is not activated and the drive pressure space is subjected to the output pressure of the pressure source 48.

In a deviation from the non-scale representation of FIG. 1, the brake booster 14 and the pressure modulator 21 are dimensioned such that the volume enlargement V, which the primary chamber 34 is subjected to when the modulator piston 28 is pushed back from its end position, associated with a minimum volume of the primary chamber 34, into its end position associated with a maximum volume of the primary chamber 34, is considerably smaller than the volume $V_{Bmax}$ of the brake fluid quantity which can be displaced into the front axle brake circuit I from the primary output pressure space 18 of the brake booster 14, when the brake booster 14 is actuated with the maximum possible pedal force.

A dimensioning relationship advantageous with respect hereto is given by the relation:

$$0.25 \leq V/V_{Bmax} \leq 0.5 \quad (1)$$

and preferably by the relation:

$$V/V_{Bmax} \approx \tfrac{1}{3} \quad (2).$$

As a consequence of this dimensioning of the pressure modulator 21, the pressure reduction which can be attained by a single piston stroke of the pressure modulator 21 when the antilocking control system responds and the wheel brake(s) 11 and/or 12 are subject to the control system, is no longer always sufficient to end the locking tendency.

A braking situation of this kind occurs, for example, when braking is begun on a section of roadway with a high adhesion coefficient between the roadway and the vehicle wheels, while at the same time the acuation force, and thus also the brake pressure, has been increased to almost its respective maximum value and the vehicle then reaches a section of roadway with a very low adhesion coefficient, for example of 0.3, between the roadway and the tires. In this situation, the vehicle wheels when violently braked tend to lock quickly. It is necessary in this situation for a large quantity of brake fluid to be released from the wheel brakes in order to obtain the brake pressure reduction necessary to end the locking tendency.

If, upon such a large release, the modulator piston 28 reaches its end position associated with a maximum volume of the primary chamber 34, or at least at the direct vicinity thereof, this is detected by the electronic control unit 61 of the ABS 10 from the position indicator output signal. The locking tendency continues and this tendency is detected by the electronic control unit from the processing of the wheel speed sensor output signals. Then the brake pressure control valves 51 and 52 are driven to their excited "I" positions, and the ABS control valve 46 as well as the inlet control valve 37 are switched back to their basic "O" position. This results in the brake fluid, which had previously been received by the primary chamber 34 from the wheel brake(s) 11 and/or 12, now being pushed back into the primary output pressure space 18 of the tandem master cylinder 14 by the displacement of the modulator piston 28, in the sense of a reduction of the volume of the primary chamber 34, resulting from subjecting the drive pressure space 44 to pressure.

The pressure modulator 21 functions in this phase of antilocking control like a return feed pump and because brake fluid is returned to the tandem master cylinder, a pedal reaction to the activation of the antilocking control system is also discernable. At the latest, when the modulator piston 28 has reached its end position associated with a minimum volume of the primary chamber 34, which in turn is detected by the position-characteristic output signal of the position indicator 92, the pressure modulator 21 switches from return feed mode back to its pressure reduction mode, in such a way that the brake pressure control valve(s) 51 and/or 52 of the brake brake(s) 11 and/or 12 reduce braking pressure, by virtue of being switched back to their basic "O" positions, and the inlet control valve 37 and the ABS control valve 46 are driven back into their excited "I" positions effecting pressure reduction in the drive pressure space.

The consequent brake pressure reduction, attainable within the possible piston stroke H of the pressure modulator piston 28, is usually sufficient to cause the wheel brake(s) 11 and/or 12 to end the locking tendency which has previously occurred at the associated vehicle wheels.

The flow path 98 of the ABS valve 46 which connects the pressurized reservoir 82 of the auxiliary pressure source 48 to the drive pressure space 44 of the pressure modulator 21 when the ABS control valve 46 is in the basic "O" position, is provided with throttle 99. The throttle 99 limits the rate of pressure increase in the primary chamber 34, i.e., the temporal increase of the output pressure of the pressure modulator 21 obtained in pressure build-up phases of the antilocking control system. These are controlled by displacement of the modulator piston 28 in the sense of a reduction of the volume of the primary chamber 34 of the pressure modulator 21.

The flow resistance of this throttle 99 is so selected that, although a sufficiently large change speed of the output pressure of the pressure modulator can be obtained for a sensitive control, the speed with which the piston 28 moves in a pressure-building phase of the antilocking control system is, however, sufficiently slow to be recorded with good precision by the position indicator 92. This allows the indicator 92 to evaluate in the sense of an optimum control of pressure build-up, pressure maintenance and any pressure reduction phases which may become necessary for the antilocking control system.

Thus, in a simple manner, the output signal of the position indicator 92 is available for controlling the successive pressure build-up phases of the antilocking control system in the course of a control cycle so that the efficiency of the control system is thereby increased.

An advantageous type of pressure build-up control can occur. If the pressure build-up phase begins at a position of the modulator piston 28 associated with a maximum volume of the primary chamber 34 of the pressure modulator 21 is detected by the electronic control unit 61 from the output signal of the position indicator 92, the control unit 61 evaluates this as an indication that the preceding pressure reduction phase(s) has (have) led to a considerable reduction of pressure, and that consequently the vehicle is moving on a surface with a low adhesion coefficient to the vehicle wheels. In this case, the pressure build-up phase is interrupted by a pressure to a pressure build-up displacement corresponding to approximately half of its maximum stroke H.

Following this, the output signals of the wheel speed sensors are checked to determine whether the brake slip of the vehicle wheels subject to the control system, is increasing again or decreasing further, so that the brake pressure can be increased again. If this is the case, then the next pressure build-up phase can be programmed by control 61 such that the piston 28 now executes a movement corresponding to the remainder of its possible pressure build-up stroke or, depending on the result of the check of the dynamic state of the vehicle wheels, only a part of this movement.

It is impossible to list all the possible control algorithms which are available by analogous utilization of the output signals of the position indicator 92 and the wheel speed sensor output signals, however, the possibilities existing have been sufficiently demonstrated by the control cycle explained above that it is believed unnecessary to discuss further variations of control cycles.

For the sake of completeness, however, it should be mentioned that when the input control valve 37 is switched back to its basic "O" position, not only upon the completion of one antilocking control cycle, or for a phase thereof, the pressure modulator 21 functions in the return feed mode as well as within an antilocking control cycle. For example, in a pressure build-up phase, even if the driver briefly releases the pedal 17 and then actuates the brake booster 14 immediately thereafter, the pressure modulator 21 will function in a return feed ABS mode. This situation would be detected by the electronic control unit 61 in that, according to the dynamic behavior of the vehicle wheels, control should be continued, whereas the wheel decelerations decrease briefly because brake fluid at the brakes can flow back via the one-way valves 53 and 54 and via the bypass line 56 to the tandem master cylinder 14. Then the change over of the inlet control valve 37 is subsequently able to immediately build up brake pressure again to an extent appropriate for control, something that would not be possible if the inlet control valve 37 had been kept closed in the meantime.

The description above on the function control of the inlet control valve 37 according to FIG. 1 also applies analogously to a corresponding control of the bypass valve 68 according to FIG. 3.

The piston position indicator output signals can be utilized for carrying out a range of important check functions relating to functional readiness of the ABS, for example, within the framework of a test cycle which can be automatically triggered when the ignition is switched on, or be triggered by means of a specially provided check switch at a time determined by the driver.

A possible sequence of such a test cycle, from which the switching related measures required for the realization are also evident to the person skilled in the art, are: the ABS control valve 46 is switched to its excited "I" position, while at the same time the inlet control valve 37 and the brake pressure control valves 51 and 52 occupy their basic "O" positions and are held at these positions until a pressure, previously present in the drive pressure space 44 of the pressure modulator 21, is completely reduced and the piston 28 has reached its end position (on the left according to FIG. 1) associated with a minimum volume of the primary chamber 34.

The output signal of the position indicator 92 characteristic of this end position will then be used to trigger the switching back of the ABS control valve 46 into its basic "O" position, while retaining valves 37, 51 and 52 in their basic "O" positions. Pressure will now be built up in the drive pressure space 44 of the pressure modulator 21.

While the piston 28 executes its stroke in the sense of a reduction in the primary chamber 34, the ABS control valve 46 is briefly switched back to its excited "I" position as soon as the piston has reached a given position, detectable from the output signal of the position indicator 92, between its two end positions. The reaction time of the ABS control valve 46 can be determined by differentiation of the output position indicator output signal. If the time is too great, then this is an indication that the valve 46 is sluggish and that it should be checked. The driver can be visually notified of this malfunction by a specific display or an audible signal can be used.

If the reaction time is within a tolerable value, then the ABS control valve 46 is switched back to its basic "O" position with the piston stroke continued until it reaches its end position associated with a minimum volume of the primary chamber 34 of the pressure modulator 21. The output signal of the position indicator 92 characteristic thereof again initiates, by driving the ABS control valve 46 into its excited "I" position, the return movement of the piston to its other end position. The time the piston 28 requires in order to reach this other end position is measured. If this time span is too great, then this is an indication that the piston 28 is sluggish and another malfunction indication which may be likewise signaled to the driver.

If the test thus far indicates that the modulator 21 is working properly, then after the piston 28 has reached its end position associated with a maximum volume of the primary chamber 34, the inlet control valve 37 and the brake pressure control valves 51 and 52 are switched to their excited "I" positions, and the ABS control valve is switched back again to its basic "O" pressure build-up position. If this does not lead to a displacement of the piston which is detectable by a constant output signal of the position indicator 92, then this is an indication that the inlet control valve 37 and the brake pressure control valves 51 and 52, in their excited "I" blocking positions, are sufficiently tight.

If, however, the output signal of the position indicator 92 indicates that the piston 28 is subject to a displacement, then this would tend to be an indication that at least one of the valves 37 as well as valve(s) 51 and/or 52 is not tight. If this is not the case, however, a further check can be obtained by individually switching back the inlet control valve 37 and the brake pressure control valves 51 and 52 in succession to their basic "O" positions for a short time span and thereafter to their excited "I" positions again, each of which should cause the piston 28 to undergo a slight displacement in the direction of its right end position associated with a minimum volume of the primary chamber 34.

The reaction times of these valves 37, 51 and 52 can be determined from the temporal correlation of the individual control signals with the signal derived from differentiation of the position indicator output signals, both for the change over to their excited "I" positions, and for the switching back to their basic "O" positions.

The reaction times of the function control valve 69 can be determined analogously, if one of these is provided within the framework of the auxiliary pressure source 48.

Utilizing the position indicator for checking for possibilities analogous to the checking steps explained above, is limited in the FIG. 3 embodiment, in that the valve chamber 76 cannot be closed off hermetically from the brake booster 14 and that the valve ball 72, when pressure is being built up in the primary chamber 34 of the pressure modulator 21', would rise from its seat 71. Analogous checking possibilities are, however, also present in the embodiment according to FIG. 3, if the driver, when the vehicle is stationary, actuates the brake system with great force in order to hold the inlet valve 37' closed, and hereby activates the test cycle.

Finally, reference is again made below to FIG. 1 for the purpose of explaining an expedient safety measure, in which a 2/2-way solenoid bypass valve 101 is connected between output 39 of the primary chamber 34 of the pressure modulator 21 of the master brake line 41 of the front axle brake circuit I and its bypass line 56, which is in direct communicative connection with the pressure output 38 of the brake booster 14. This bypass valve 101 is driven simultaneously with the inlet valve 37 to its illustrated basic "O" through-flow position and to its excited "I" blocking position, so that if the inlet valve 37 ever sticks in its locking position, it is still possible to brake via the bypass valve 101.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An antilocking system for a road vehicle having vehicle wheels and a hydraulic multiple circuit brake system, comprising:
    at least one closed static brake circuit which is connected to at least one wheel brake from an output pressure space of a brake booster in which a static pressure, proportional to a force of brake actuation is generated;
    the connection includes an inlet valve means which is mechanically drivable into an open position;
    said inlet valve means located in a primary chamber of a pressure modulator means for controlling pressure reduction, pressure build-up, as well as pressure maintenance phases of said antilocking control system to said at least one wheel brake of said static brake circuit;
    said wheel brake connectable to and alternatively closed from said primary chamber of said pressure modulator means;
    an electrically controllable brake pressure control valve means in the form of a 2/2-way solenoid valve in the connection between said primary chamber and said at least one wheel brake;
    said pressure modulator means having a drive pressure space separated from said primary chamber by a modulator piston;
    said drive pressure space being connected in normal antilocking braking control operations to a pressure output source means;
    said pressure output source means providing and maintaining a high pressure level of brake fluid;
    an auxiliary pressure source means providing a high output pressure brake fluid source connected to said drive pressure space via an electrically controllable ABS function control valve to supply high pressure brake fluid to said drive pressure space when said ABS valve is in its basic position;
    said high pressure brake fluid in said drive pressure space applying a force to said modulator piston, which is biased against said high pressure force by the action of a powerful restoring spring and pressure prevailing in said primary chamber;
    said high pressure force displacing said piston to an end position associated with a minimum volume of said primary chamber;
    an electronic ABS control for shifting said ABS valve from its basic position to an excited position wherein said ABS valve controls a flow of pressure from said drive pressure space to a pressureless reservoir of said auxiliary pressure source upon activation of said antilocking control system in the sense of a brake pressure reduction at said at least one wheel brake of said static brake circuit;
    said ABS valve being switched back to its basic position by said ABS control during at least one of a directly succeeding pressure build-up phase, a pressure maintenance phase of the antilocking control system at said at least one of said wheel brakes, as well as an operating phase of said antilocking control system in which all wheel brakes of said static brake circuit are closed from said primary chamber of the pressure modulator due to brake fluid being fed back from said at least one wheel brake into said brake booster;
    wherein said primary chamber has a maximum volume corresponding to between 25% and 50% of a volume of brake fluid quantity which can be expelled by an actuation of said brake booster with a maximum possible force of brake actuation into said brake circuit;
    wherein said ABS electronic control provides control signals necessary for appropriately controlling said ABS control valve in response to output signals characteristic of the motion behavior of said vehicle wheels from wheel speed sensors associated with said vehicle wheels;
    bypass control valve means opened when said modulator piston reaches at least one of its end positions associated with a maximum volume of said primary chamber, or reaches the immediate vicinity thereof, to connect said brake booster to said at least one wheel brake through a bypass flow path, and wherein:
    said bypass control valve means is a solenoid valve which is driven from its basic position in which said bypass flow path is opened by an output signal from said electronic ABS control unit into an excited position in which said bypass flow path is blocked;
    said at least one pressure control valve means being movable to a basic open position to allow flow between said primary chamber and said at least one wheel brake when, in the course of said pressure reduction, pressure build-up or pressure maintenance control phase of said antilocking control system, said high output pressure of said auxiliary pressure source falls below a minimum setpoint required for the displacement of said modulator piston into its end positions associated with a minimum volume of said primary chamber, and wherein this pressure control valve means is held in this basic position.

2. An antilocking control system according to claim 1, wherein a position indicator means is provided which generates electrical output signals characteristic of the displacement of said modulator piston; said output signals being connected to said electronic ABS control unit as further information inputs; said electronic ABS control unit generating signals characteristic of the displacement behavior of said modulator piston from its beginning to its possible end positions for switching said bypass valve means into said excited blocking position.

3. An antilocking system according to claim 1, wherein said inlet valve means is a one-way valve which is actuated in an opening direction by higher pressure in said primary chamber of said pressure modulator than in a valve chamber connected between said brake booster and said bypass path;
    a valving surface of said inlet valve being raised from a seat by an actuation tappet displaced by said piston of said pressure modulator;

said tappet, when said piston of said pressure modulator at least occupies said end position associated with a minimum volume of said primary chamber, or is distanced from the latter end position by less than a small fraction of 1/20 to 1/5 of its possible total displacement, passing through an inlet channel of said pressure modulator which contains said valve seat; and wherein said valving surface is biased tightly against said valve seat by the restoring force of a valve spring and pressure prevailing in said valve chamber in said bypass path.

4. An antilocking system according to claim 1, wherein said at least one wheel brake subjectable to the antilocking control system is connected via a one-way valve to a second bypass path leading to an output of said brake booster.

5. An antilocking system according to claim 1, wherein said ABS control valve has a flow path providing the connection of said pressure output of said auxiliary pressure source to said drive pressure space of said pressure modulator when said ABS control valve is in said basic position, that is provided with a throttle means for restricting the pressure medium flow rate to said pressure modulator to a given value.

6. An antilocking system according to claim 1, wherein a further function control valve is provided between said auxiliary pressure source and said ABS control valve, and is controllable by output signals of said electronic ABS control unit;

said pressure reservoir being chargable by an accumulator-type charge pump and being maintained at a specific required output pressure level by a pressure-limiting valve connected between an output pressure of said pump and a return line leading to a pressureless reservoir;

a second one-way valve connected between said further function control valve and said ABS control valve;

said electronic ABS control unit shifting said further function control valve from a basic position wherein said pressure reservoir is connected to said ABS control valve to an excited position, which closes said connection between said further function control valve and said ABS control valve, while connecting said pressure output of said pump to a pressureless reservoir line.

7. An antilocking system according to claim 1, wherein said pressure modulator is designed as a step cylinder having bore steps of different diameters which merge into one another via housing step;

said piston having a correspondingly shaped two-step configuration with a larger piston step defining with said larger diameter cylinder step said drive pressure space, and a smaller piston step defining with a smaller diameter cylinder step said primary chamber of said pressure modulator;

said piston having a central conical section tapering in axial direction between its two steps;

said piston steps being sealed against said two-stepped cylinder;

said position indicator having an actuating pin radially supported on said central conical section;

said position indicator configured as a travel/voltage converter means for converting radial displacements of said actuating pin into voltage signals which can be processed by said ABS electronic control.

8. An antilocking system according to claim 7, wherein said spring, biasing said modulator piston into its end position associated with a maximum volume of said primary chamber, is designed as a helical pressure spring which is accommodated in a central blind bore of said modulator piston in a section of its length approximately corresponding to an axial extension of said smaller piston step and said conical central section of said piston.

9. An antilocking system according to claim 1, wherein said modulator piston is supported in said housing of said pressure modulator, and wherein an additional restoring spring, the restoring force of which is of a maximum at the position associated with a minimum volume of said primary chamber also biases said piston as it is displaced increasingly away from this minimum volume position; and wherein this addition restoring force reduces to a zero value at approximately ¼ to ⅓ of said displacement of said piston.

10. An antilocking system according to claim 9, wherein the sum of the maximum values of the restoring forces of said biasing springs and the force of said brake booster acting upon said piston in said primary chamber operate in the sense of an enlargement of said primary chamber volume, and are of a value which is at least less than, or approximately equal to, the force in said drive pressure space which displaces said piston into its end position associated with a minimum volume of said primary chamber when said modulator piston is subjected to the output pressure of said auxiliary pressure source.

11. An antilocking system according to claim 10, wherein said further restoring spring is a diaphragm spring which is supported on one side by a housing step of said pressure modulator housing.

12. An antilocking system according to claim 1, wherein there are at least two braking circuits and each braking circuit includes its own pressure modulator, inlet valve, brake pressure control valve and ABS control valve.

* * * * *